US010235901B2

(12) United States Patent
Fry et al.

(10) Patent No.: US 10,235,901 B2
(45) Date of Patent: Mar. 19, 2019

(54) AUTOMATED TRAINING AND EVALUATION OF EMPLOYEES

(71) Applicant: Accenture Global Services Limited, San Jose, CA (US)

(72) Inventors: Jocelyn A. Fry, London (GB); Jennifer L. Hopkins, Oldham (GB)

(73) Assignee: Accenture Global Services Limited, Dublin (IE)

( * ) Notice: Subject to any disclaimer, the term of this patent is extended or adjusted under 35 U.S.C. 154(b) by 137 days.

(21) Appl. No.: 14/609,294

(22) Filed: Jan. 29, 2015

(65) Prior Publication Data
US 2016/0225283 A1 Aug. 4, 2016

(51) Int. Cl.
*G09B 19/00* (2006.01)
*G06Q 10/10* (2012.01)
*G09B 7/02* (2006.01)
*G09B 7/06* (2006.01)

(52) U.S. Cl.
CPC ....... *G09B 19/0076* (2013.01); *G06Q 10/105* (2013.01); *G09B 7/02* (2013.01); *G09B 7/06* (2013.01)

(58) Field of Classification Search
CPC .................................................. G09B 19/0076
See application file for complete search history.

(56) References Cited

U.S. PATENT DOCUMENTS

| 5,785,181 | A | * | 7/1998 | Quartararo, Jr. | ....... G06K 17/00 209/3.3 |
| 5,786,764 | A | * | 7/1998 | Engellenner | ......... G06Q 10/087 340/10.42 |
| 5,930,769 | A | * | 7/1999 | Rose | ...................... G06Q 30/06 345/419 |
| 6,140,922 | A | * | 10/2000 | Kakou | ................... G06Q 30/02 235/385 |

(Continued)

OTHER PUBLICATIONS

Nadia Catwalk Show; Dec. 2, 2014; web.archive.org/web/20141202180100/http://www.dressupgirl.net/dressup/1870/nadia-catwalk-show.html.*

(Continued)

*Primary Examiner* — Eddy Saint-Vil
*Assistant Examiner* — William D Ermlick
(74) *Attorney, Agent, or Firm* — Fish & Richardson P.C.

(57) ABSTRACT

This specification generally relates to automated training and evaluation of employees. One example method includes presenting a clothing selection task to an employee, the clothing selection task including providing categories of clothing items to the employee and directing the employee to select a clothing item for each of the categories, and associated with a training scenario including evaluation criteria for evaluating the clothing items selected by the employee; in response to presenting the clothing selection task to the employee, identifying a set of clothing item selections by the employee associated with the categories included in the clothing selection task; in response to (Continued)

identifying the set of clothing item selections, automatically evaluating the set of clothing item selections based on the evaluation criteria included in the training scenario associated with the clothing selection task; and presenting a result of automatically evaluating the set of clothing item selections to the employee.

8 Claims, 20 Drawing Sheets

(56) References Cited

U.S. PATENT DOCUMENTS

| | | | | |
|---|---|---|---|---|
| 6,661,433 | B1* | 12/2003 | Lee | G06T 19/006 235/383 |
| 6,944,624 | B2* | 9/2005 | Orton | G06Q 10/10 |
| 7,346,561 | B1* | 3/2008 | Devitt | G06Q 10/087 705/26.61 |
| 7,385,479 | B1* | 6/2008 | Green | G06Q 10/00 340/286.02 |
| 8,103,551 | B2* | 1/2012 | Saul | G06N 3/02 705/26.1 |
| 8,249,941 | B2* | 8/2012 | Saul | G06N 3/02 705/26.1 |
| 8,260,684 | B2* | 9/2012 | Flusser | G06Q 30/00 705/26.1 |
| 2001/0042675 | A1* | 11/2001 | Jacobson | B65G 47/61 198/728 |
| 2003/0177069 | A1* | 9/2003 | Joseph | G06Q 10/087 705/22 |
| 2006/0204948 | A1* | 9/2006 | Sims, Jr. | G06Q 10/10 434/323 |
| 2007/0198120 | A1* | 8/2007 | Wannier | A41H 3/007 700/138 |
| 2008/0181511 | A1* | 7/2008 | Tuttle | G09B 19/0076 382/209 |
| 2008/0243643 | A1* | 10/2008 | Knight | G06Q 30/02 705/26.5 |
| 2008/0255920 | A1* | 10/2008 | Vandergriff | G06Q 30/06 700/132 |
| 2009/0037295 | A1* | 2/2009 | Saul | G06N 3/02 705/26.64 |
| 2009/0138342 | A1* | 5/2009 | Otto | G06Q 30/02 706/45 |
| 2009/0281922 | A1* | 11/2009 | Childress | G06N 5/025 705/26.1 |
| 2013/0080289 | A1* | 3/2013 | Roy | G06Q 10/10 705/26.8 |
| 2013/0103397 | A1* | 4/2013 | Almaer | G10L 15/20 704/233 |
| 2013/0166358 | A1* | 6/2013 | Parmar | G06Q 10/06393 705/7.39 |
| 2013/0183642 | A1* | 7/2013 | Wan | G09B 19/0092 434/127 |
| 2013/0203026 | A1* | 8/2013 | Sundaresh | G09B 7/00 434/219 |
| 2014/0114884 | A1* | 4/2014 | Daway | G06Q 90/00 706/11 |
| 2014/0279294 | A1* | 9/2014 | Field-Darragh | G06Q 10/087 705/28 |
| 2014/0304020 | A1* | 10/2014 | Casper | G06Q 10/06311 705/7.17 |
| 2014/0344102 | A1* | 11/2014 | Cooper | G06Q 30/0631 705/26.7 |
| 2014/0379426 | A1* | 12/2014 | Guo | G06T 11/60 705/7.31 |
| 2014/0379526 | A1* | 12/2014 | Parham | B62B 3/1424 705/26.41 |
| 2015/0051994 | A1* | 2/2015 | Ward | G06Q 30/0639 705/23 |
| 2016/0063587 | A1* | 3/2016 | Fry | G06Q 30/0621 705/26.5 |
| 2016/0078484 | A1* | 3/2016 | Emigh | G06Q 30/0211 705/14.58 |
| 2016/0189039 | A1* | 6/2016 | Leppanen | G06N 5/04 706/11 |
| 2016/0328784 | A1* | 11/2016 | Jones | G06Q 30/0639 |

OTHER PUBLICATIONS

Australian Office Action for Application No. 2016200376, dated Mar. 10, 2017, 3 pages.

* cited by examiner

AUTOMATED TRAINING AND EVALUATION OF EMPLOYEES

TECHNICAL FIELD

This specification generally relates to automated training and evaluation of employees.

BACKGROUND

Businesses often implement training and evaluation for their employees. For example, retail stores typically train and evaluate their employees in different aspects of the business, including performing common operations and tasks associated with the stores, handling merchandise that is sold in the stores, and/or interacting with customers of the stores.

SUMMARY

This specification generally relates to automated training and evaluation of employees. One example method includes presenting a clothing selection task to an employee, the clothing selection task including providing categories of clothing items to the employee and directing the employee to select a clothing item for each of the categories, and associated with a training scenario including evaluation criteria for evaluating the clothing items selected by the employee; in response to presenting the clothing selection task to the employee, identifying a set of clothing item selections by the employee associated with the categories included in the clothing selection task; in response to identifying the set of clothing item selections, automatically evaluating the set of clothing item selections based on the evaluation criteria included in the training scenario associated with the clothing selection task; and presenting a result of automatically evaluating the set of clothing item selections to the employee.

Figure 1:
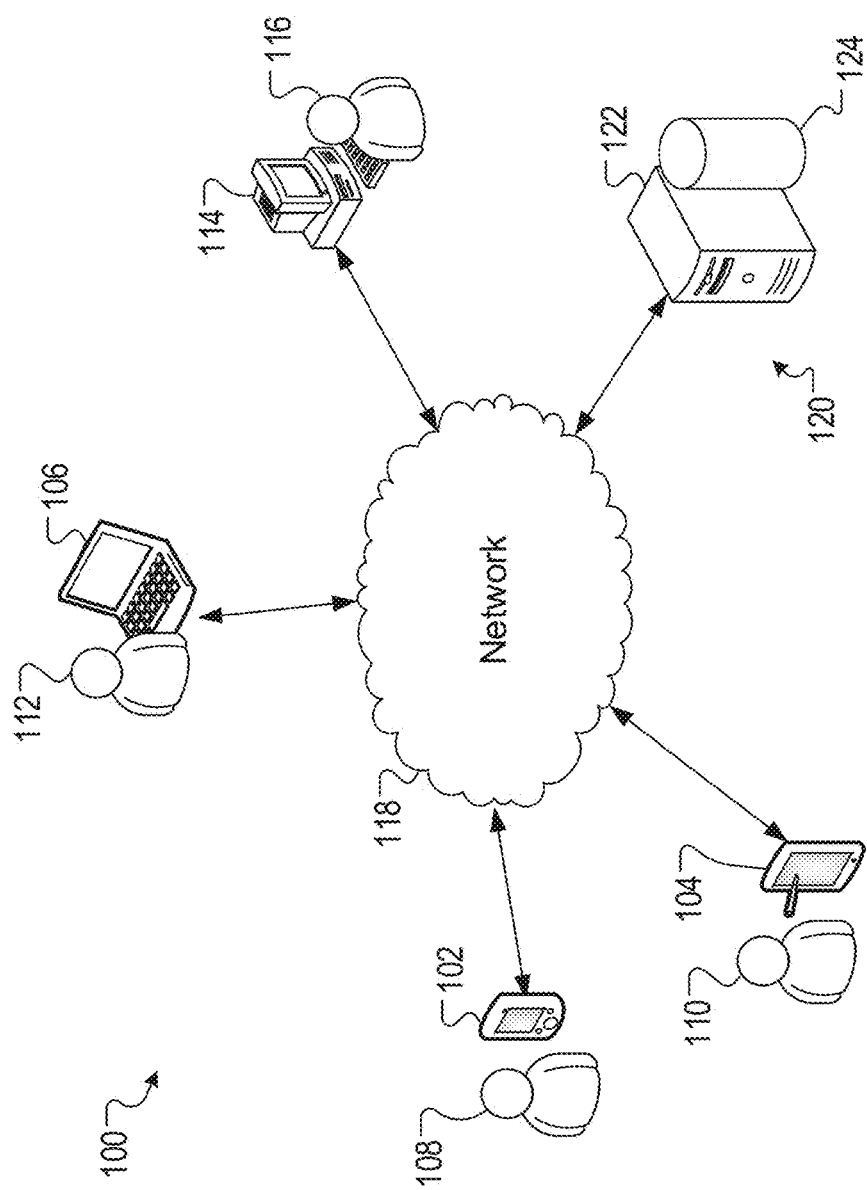
FIG. 1 is a block diagram illustrating an example of a system that can execute implementations of the present disclosure.

In the following text, a detailed description of examples will be given with reference to the drawings. It should be understood that various modifications to the examples may be made. In particular, elements of one example may be combined and used in other examples to form new examples. Like reference symbols in the various drawings indicate like elements.

DETAILED DESCRIPTION

A business can incur significant costs associated with training and evaluation of its employees. Such costs may include not only costs of developing and implementing training programs, but also costs associated with time and effort expended by a business and its employees to participate in the training and evaluation. Such a situation can result in loss of revenue and inefficiency in operating a business. Compounding these difficulties, employees may lack motivation to participate in such training programs, resulting in further loss of business efficiency caused by undertrained employees.

Techniques according to the present disclosure enables automated training and evaluation for employees of a business. The techniques may be implemented in systems, methods, computer-readable media, or other forms as described herein. For example, a system according to the present disclosure may enable a store to specify tasks and criteria, including objective and/or subjective criteria, by which to evaluate employees. The system may automatically evaluate employee performance by determining a degree to which the employee fulfilled the specified criteria or completed specified tasks. Subjective aspects of a business may include, for example, the quality of the trainee's interactions with customers, the trainee's recommendations of items for particular customers, awareness of trends in the business, etc. Objective tasks may include quantitative metrics such as completion of specific tasks, a time duration required by the trainee to complete a task, etc.

The system may be implemented on a mobile platform that may enable a business to provide dynamic, on-the-job training and evaluation for its employees. The system may provide interactive graphical user interfaces (GUIs) on mobile devices operated by employees. The system may enable employees not only to view training material on mobile devices, but also to use mobile devices to actively participate in the training. The mobile nature of the system enables employees to utilize mobile devices to participate in the training and evaluation at any time, such as during normal operating hours of a business when there are fewer customers in the store. As such, the system may enable a business to provide on-the-job training and evaluation to its employees, so that the employees can regularly update their knowledge and training in real-time without necessarily being required to take time off from work to participate in separate training programs.

The system may enable the retail clothing store to provide incentives to its employees to participate in training and achieve positive training results. For example, the system may provide a role-playing game setting in which employees presented with various hypothetical scenarios and are given rewards. The rewards may be associated with real-world benefits such as free clothing items from the store, monetary bonuses, etc. As such, the system may provide an interactive and engaging mobile platform that enables a store to provide real-world incentives designed to help drive participation and effort in the training and evaluation program.

The system may also enable a store to provide other types of information to its employees, such as announcements from business management, relevant news related to the business, general trends in the industry, etc. The system may also enable a trainee to collaborate and communicate with other members of the business. In some implementations, the system may enable and/or supplement additional store processes, such as facilitating compliance with visual merchandising guidelines, e.g., ensuring that particular clothing items are correctly displayed on mannequins and/or in other display areas of the store. As such, the system may provide a comprehensive, interactive, and incentivized mobile platform by which businesses may provide on-the-job training and evaluation for its employees.

As an example, in the context of a retail clothing business, the system may enable a store to evaluate its employees according to subjective criteria related to fashion. The system may enable the store to specify one or more fashion-related criteria. The store may specify criteria such as particular clothing items or combinations of clothing items that are appropriate for particular types of customers. The criteria may be based on attributes of the clothing items, such as color of the clothing items, trendiness of the clothing items, and/or combinability of different clothing items. In some implementations, the criteria may also be based on specific characteristics of customers themselves, such as demographic, shopping habits, etc. The system may then automatically implement a training and evaluation program based on the subjective fashion-related criteria specified by the store.

The system may enable the employees to use mobile devices to scan or photograph actual clothing items that are located throughout the store as part of a training program. The system may also use geolocation techniques, such as radio frequency identification (RFID) tags, to identify locations of employees and/or clothing items in the store as part of the training. In some implementations, the system may also measure a time delay required by the trainee to physically locate and scan particular clothing items selections. As such, the system may enable a store to train and evaluate its employees not only to recommend appropriate clothing items for particular customers, but also to quickly and accurately locate the particular clothing items throughout the physical store.

The system may enable a clothing store to specify, in addition to subjective criteria related to fashion, one or more objective criteria to evaluate employees. As an example, objective criteria may include knowledge of locations of various items located throughout the store, prices of the items, general operations of the store, and/or other characteristics of the store. The system may, in some implementations, combine subjective criteria with objective criteria to provide comprehensive training and evaluation for employees.

FIG. 1 depicts an example system 100 in which implementations of the present disclosure may be implemented. In the example system 100 of FIG. 1, client devices 102, 104, 106, operated by users 108, 110, and 112, respectively, may execute a mobile training and evaluation platform. For example, users 108, 110, and 112 may be employees of a business, such as a retail clothing store.

In some implementations, there may additionally be one or more administrative systems, such as administrative system 114, operated by one or more administrative users, such as administrative user 116 in FIG. 1. An administrative user may be, for example, a manager of a business or other administrative user associated with the business, who may utilize one or more computers to input criteria and/or tasks that are used by the mobile training and evaluation platform.

In some implementations, the computing devices 102, 104, 106, and 114 are computing devices, such as laptop or desktop computers, smartphones, personal digital assistants, wearable computers, portable media players, tablet computers, or other appropriate computing devices that can be used to communicate with an electronic communication network, such as electronic communication network 118 in FIG. 1. In addition, one or more of the computing devices 102, 104, 106, and 114 may perform client-side operations, as discussed in further detail herein.

In some implementations, the mobile training and evaluation platform may be hosted by a system, such as host system 120 in FIG. 1. The host system 120 may be physically located at a retail store in which employees are being trained, or may be located at a remote location, such as a central business center or cloud server. In some implementations, the host system 120 may provide client-side information that is downloaded on web browsers or applications executed on the client devices 102, 104, and 106.

The host system 120 may include one or more servers, such as server 122, and one or more storage devices, such as storage device 124, storing computer-readable instructions. The server 122 may communicate, as needed, with the client devices 102, 104, and 106 executing the mobile training and evaluation platform. For example, in some implementations, the host system 120 may, in addition to providing client-side software for download by the client devices 102, 104, and 106, additionally store server-side information that is used by the training and evaluation platform. The system may use the server-side information to interact with the client devices 102, 104, and 106 as the client-side training and evaluation software is executed on the client devices by employees. The host system 120 may communicate with the client devices 102, 104, and 106 by a communication medium, such as a communication network 118.

In some implementations, the network 118 is a public communication network, such as, for example, the Internet, cellular data network, or a telephone network accessed via dialup modems. The network 118 may also be a private communications network, such as, for example, private LAN, leased lines. The network 118 may include one or more networks. The network(s) may provide for communications under various modes or protocols, such as, for example, Wi-Fi, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), among others. For example, the communication may occur through a radio-frequency transceiver. In addition, short-range communication may occur, such as using a BLUETOOTH, Near Field Communications (NFC), or other such transceiver.

Figure 2:
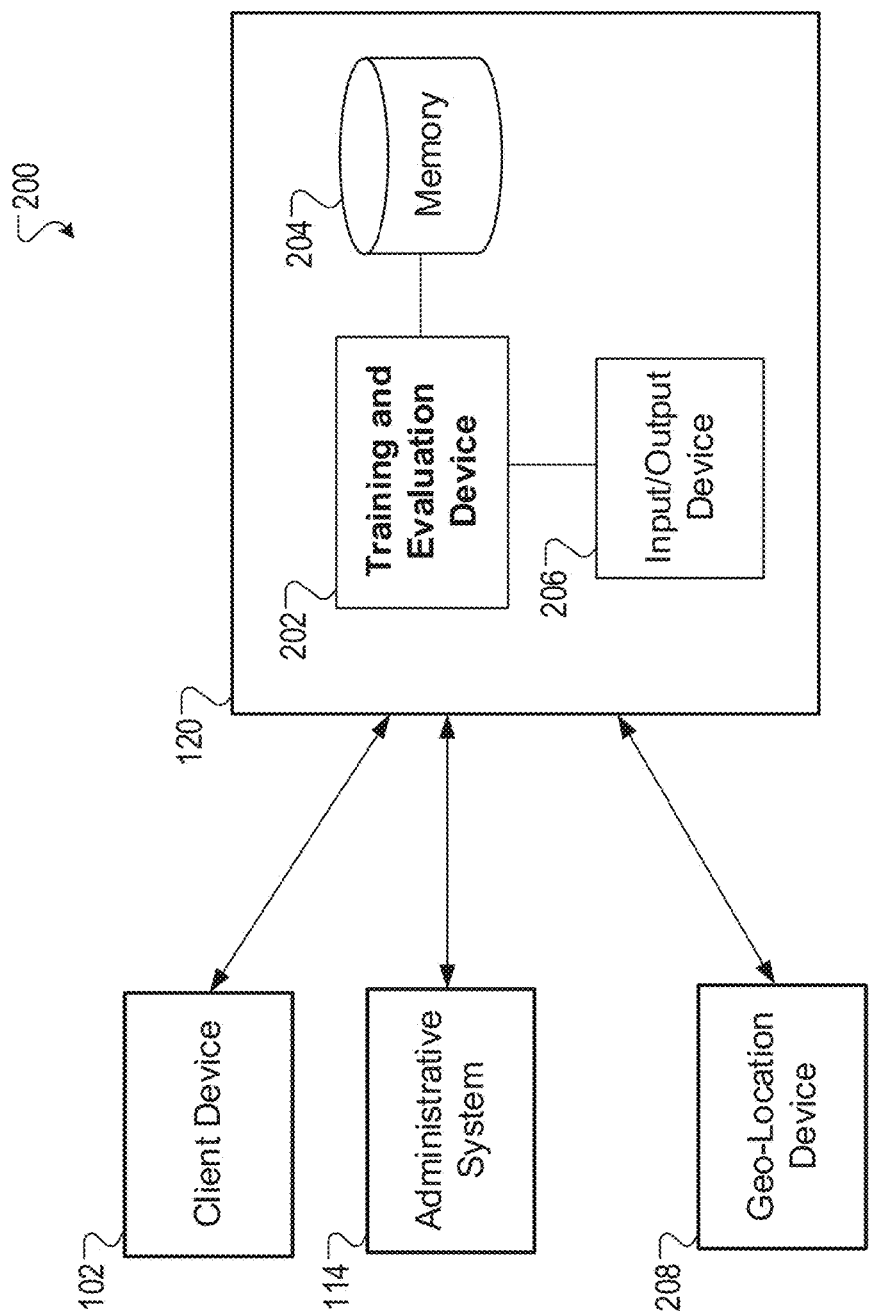
FIG. 2 is a block diagram illustrating an example of components of a system that performs automated training and evaluation of employees.

FIG. 2 depicts an example of components of a system 200 that performs automated training and evaluation of employees. In the example of FIG. 2, the system 200 includes a host system 120. The host system 120 may include a training and evaluation device 202. The training and evaluation device 202 may include, or communicate with, one or more processors and one or more storage devices that are configured to implement automated training and evaluation of employees. For example, the training and evaluation device 202 may utilize one or more memory modules 204 to store data related to employees of a store, training criteria and tasks specified by the store, news and trends associated with the business, or other information. The training and evaluation device 202 may also receive inputs from users, such as employees receiving training, administrative users setting up the training program, or other users. For example, the training and evaluation device 202 may use one or more input/output devices 206 to communicate information with other devices, such as client device 102 operated by an employee and, in some implementations, administrative system 114 operated by an administrative user.

In some implementations, the training and evaluation device 202 may communicate with other devices, such as a geolocation device 208. For example, in the context of a retail clothing store, the geolocation device 208 may be an RFID tag that is attached to items of clothing. The RFID tag may be communicative with the training and evaluation device 202 to track the locations of particular items of clothing and evaluate employees in terms of their knowledge of the locations of the clothing items.

The training and evaluation device 202 may be a module that is added to a general purpose computer to create a modified computer that achieves the functionality described. In some implementations, the training and evaluation device 202 includes specialized hardware that is designed to control operations of other components of the training and evaluation system 200. The training and evaluation device 202 may interact with one or more other specialized components (which may include specialized hardware) to achieve the functionality described.

FIGS. 3 to 16 depict examples of graphical user interfaces (GUIs) that may be used for performing automated training and evaluation of employees. These examples depict user interfaces that may be presented by a mobile training and evaluation system implemented in the context of a retail clothing store, such as, for example, system 200 of FIG. 2. The training and evaluation system in these examples implements a role-play scenario in which the trainee is presented with hypothetical customers for whom the trainee is to select and locate appropriate clothing items in the store. The system prompts the trainee to select and physically locate the recommended clothing items in the store, and evaluates the trainee's performance, including the quality of the trainee's recommendation and the trainee's ability to locate the recommended items, based on one or more criteria specified by the store.

Figure 3:
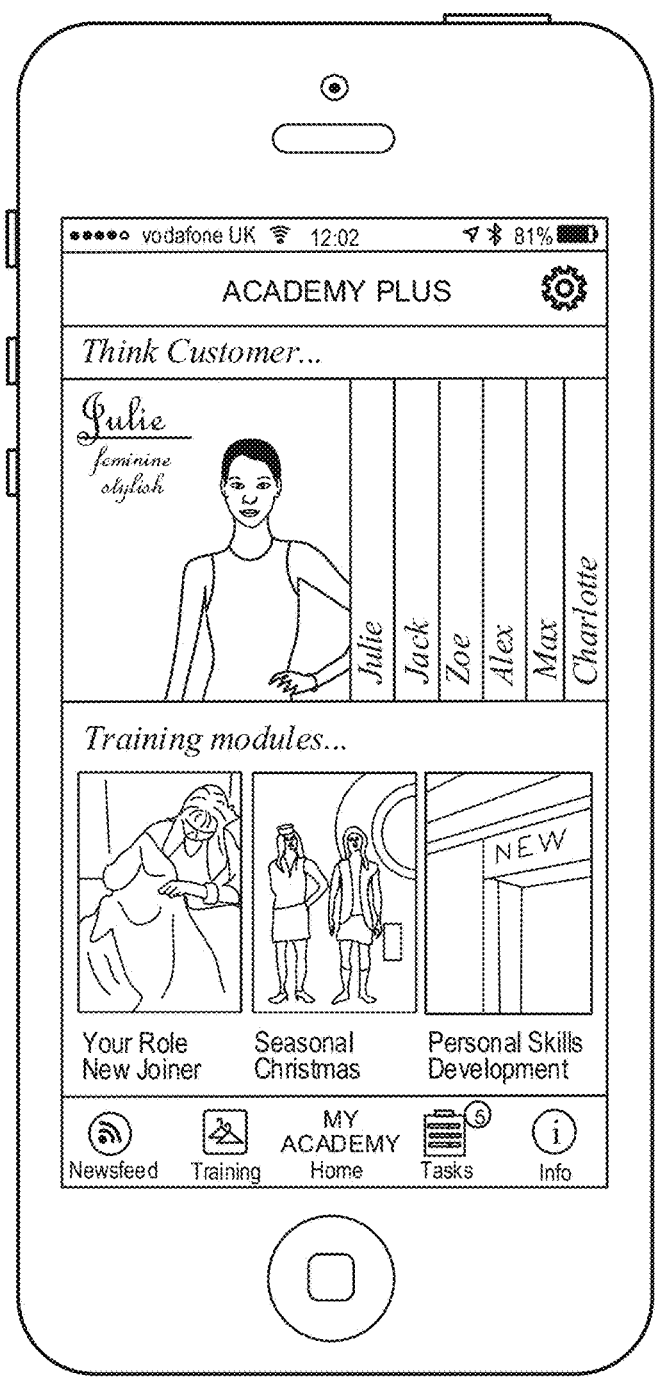
FIGS. 3 to 20 are examples of graphical user interfaces (GUIs) that may be used for performing automated training and evaluation of employees.

FIG. 3 depicts an example GUI 300 in which the training and evaluation system presents a trainee with hypothetical customers, one of which is displayed as "Julie." In this example, the system also provides various training modules, which may include different types of training and evaluation scenarios based on a particular role of the trainee, or a particular timeframe to which the training is directed, such as a holiday season, or based on particular skills that the trainee wishes to develop. The system may customize the training and/or evaluation of the training based on the particular training module that is selected.

Figure 4:
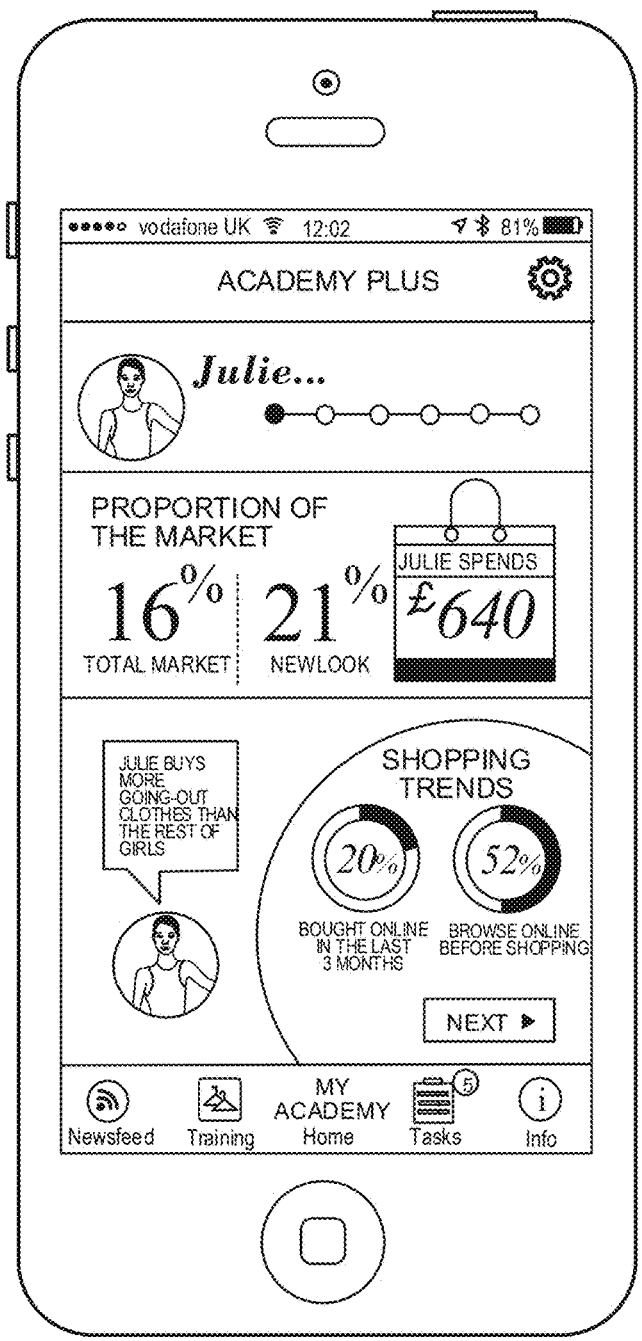

FIG. 4 depicts an example GUI 400 in which the training and evaluation system presents a trainee with information about the hypothetical customer "Julie." Such customer information may include characteristics regarding the fashion preferences or shopping habits or other information related to the hypothetical customer. For example, the customer information may include information regarding particular types of events for which the customer typically buys clothes, such as parties or leisure activities, or information regarding online shopping habits of the customer, or information regarding monetary amounts spent by the customer in a typical purchase. Such customer information may be determined from any source, including databases of actual customer records associated with the store, computer-generated simulations of customers, and/or manually entered information.

The system may present various training tasks for the trainee based on the hypothetical customer. For example, in some implementations, the system may present a trainee with a role-playing customer interaction task, such as a "what would I say" quiz. The system may score the trainee's performance on such question-and-answer sessions based on objective or subjective criteria. In addition, the system may present the trainee with a clothing selection task.

Figure 5:
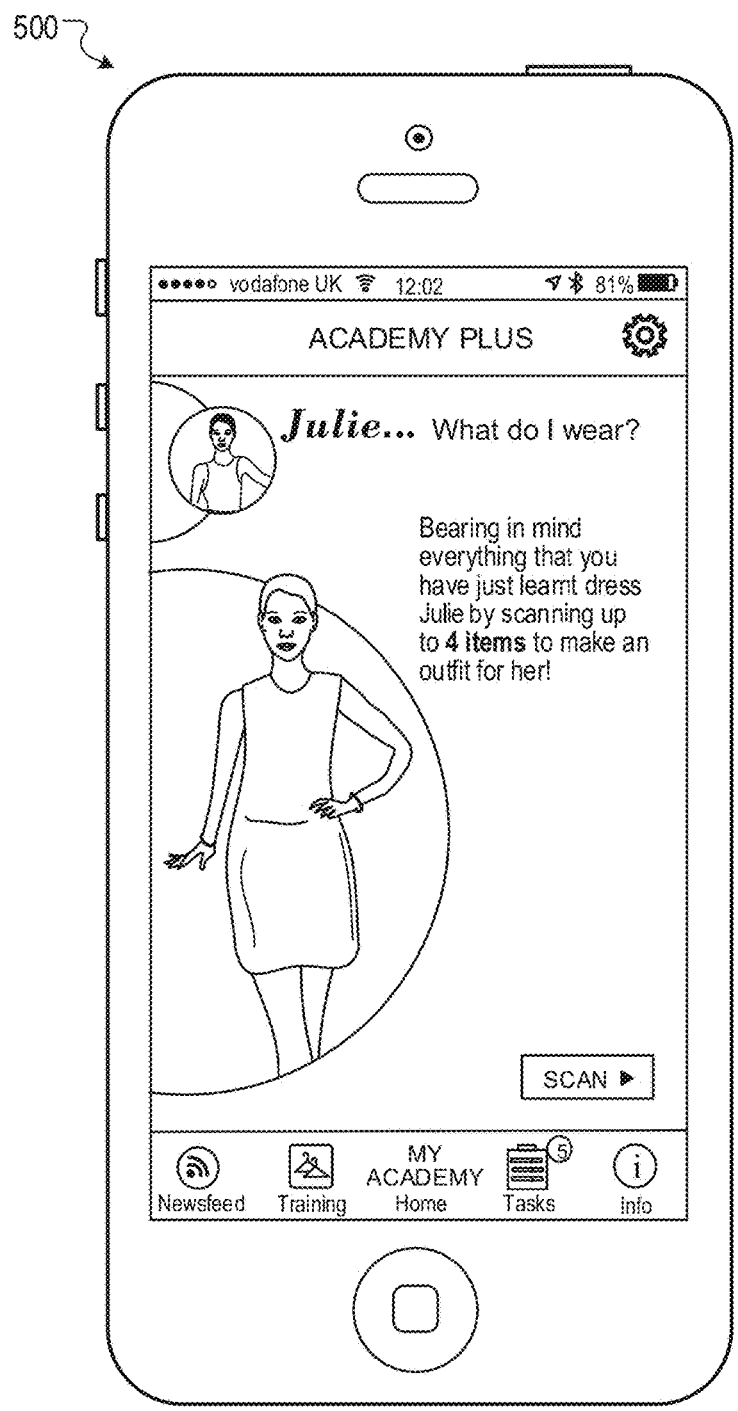

FIG. 5 depicts an example GUI 500 in which the training and evaluation system presents a trainee with a clothing selection task. In this example, the training and evaluation system prompts the trainee to select up to four clothing items to make an outfit for the hypothetical customer presented in FIG. 4.

In some cases, the system enables the trainee to select the clothing items by physically locating the clothing items in the store and using the trainee's mobile device to input information regarding the physical clothing item. The system may identify a set of clothing item selections by the trainee using various techniques. For example, the system may identify that the trainee selected a particular clothing item by receiving an image of the selected clothing item from the trainee's mobile device. The system may also identify the trainee's clothing item selection by receiving data from a barcode scanner representing the selected clothing item from the trainee's mobile device.

In the example of FIG. 5, the GUI 500 includes a "scan" button that the trainee may select to input barcodes of selected physical clothing items that the trainee locates in the store. The system may also present GUI options for capturing an image of the selected clothing items using the trainee's mobile device.

Figure 6:

FIG. 6 depicts an example GUI 600 in which the training and evaluation system presents a trainee with a clothing selection task. The GUI 600 display one or more categories for which clothing items are to be selected. In this example, the trainee inputs the clothing items using a barcode scanner. The categories of clothing items may include one or more clothing items, such as shoes, shirts, skirts, accessories, and/or other items. In the example of FIG. 6, the system prompts the trainee to select items for four categories: a skirt, shoes, bag, and accessories. The clothing selection task may direct the trainee to select a clothing item for each of the categories.

In the example of FIG. 6, the trainee has input a barcode for a particular clothing item, in this case a skirt, and the GUI 600 displays an image and/or other information regarding the selected skirt. In some implementations, the system may enable the trainee to press a "preview" button to view the set of clothing item selections. The system may enable the trainee to continue to the next stage by pressing a "next" button. In some cases, the functionalities of both the "preview" and "next" buttons may be implemented by a single "next" button.

Figure 7:
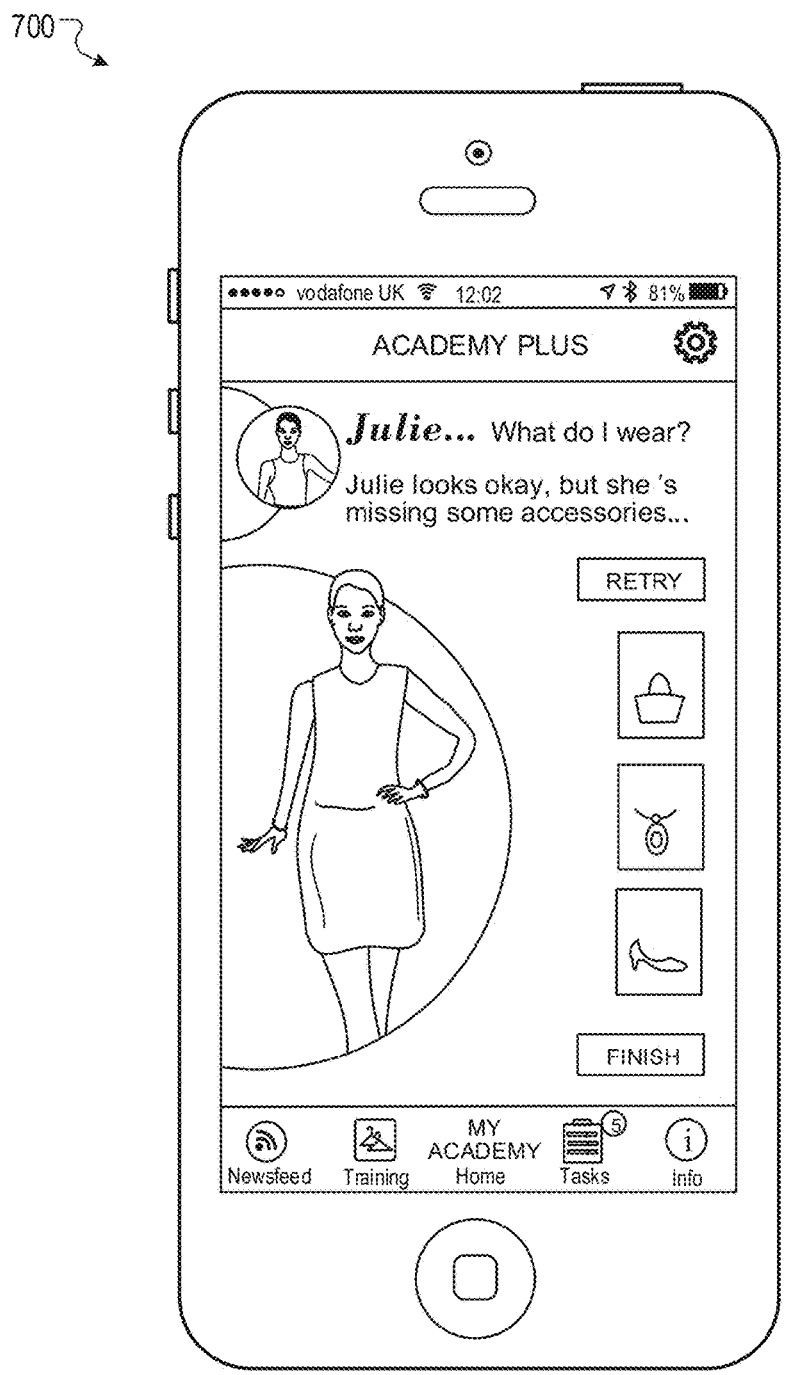

FIG. 7 depicts an example GUI 700 in which the training and evaluation system presents a summary of the trainee's selected clothing items. The system may recognize that the trainee has only selected a clothing item for one of the four categories, and present an image of the resulting incomplete set of clothing items. The system may enable the trainee to either return to the previous training session by clicking on a "retry" button, or to finish the training session by clicking on a "finish" button. If the trainee selects the "finish" button to complete the training session, the system may automatically evaluate the trainee's set of clothing item selections.

Figure 8:
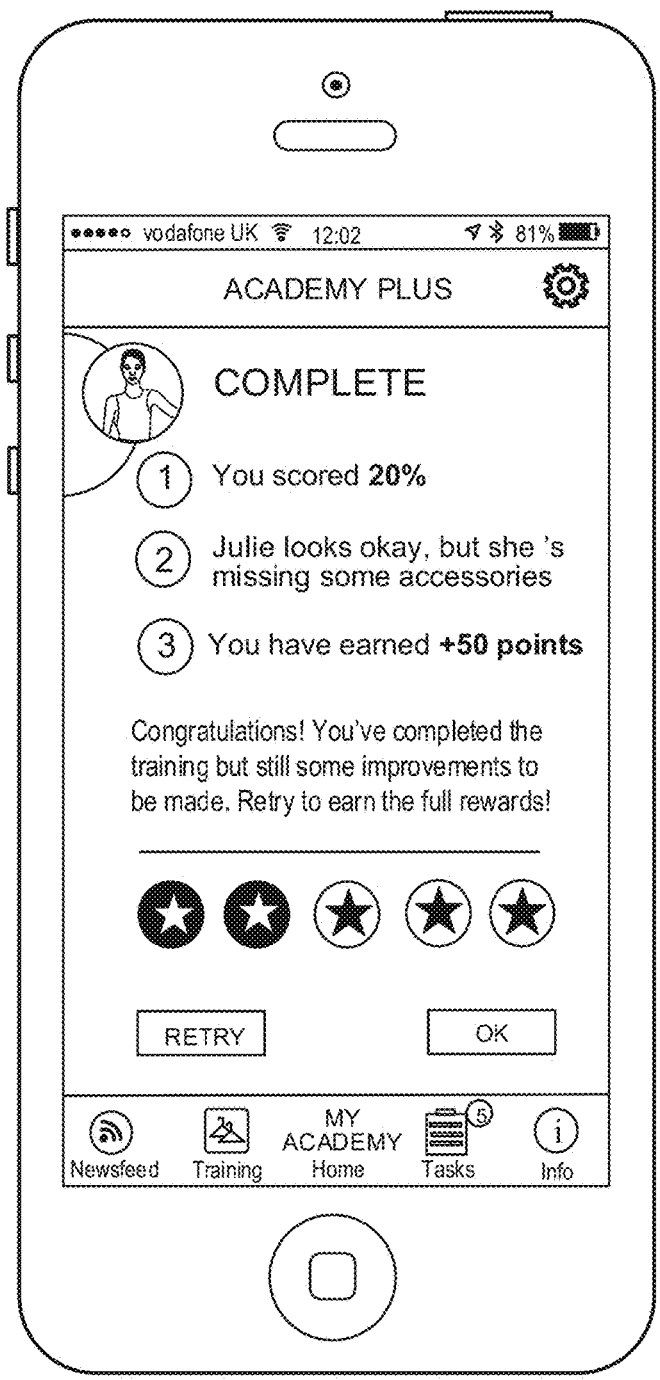

FIG. 8 depicts an example GUI 800 in which the training and evaluation system presents results of a training session in which the training has selected the "finish" button in FIG. 7. The system may output various evaluation results, such as, for example, a numerical score, evaluation comments, rewards that have been earned by the trainee as a result of the training session, and/or other types of output.

In this example, the system may identify that the trainee has selected clothing items for fewer than all of the prompted categories. For example, in FIG. 7, the system may identify that the user has selected only the one "skirt" category of the four prompted categories of a skirt, shoes, bag, and accessories, and may output an evaluation indicating the incomplete training. GUI 800 displays an output including an evaluation score of 20%, a comment indicating that the customer may still need more clothing items, and a reward of 50 points. The system may enable the trainee to return to the previous training session to complete the selections for the other three categories.

Figure 9:

FIG. 9 depicts an example GUI 900 in which the training and evaluation system prompts the trainee to select clothing items for the remaining prompted categories. In the example of FIG. 9, the system prompts the user to locate and scan barcodes for items in the three remaining categories of shoes, bags, and accessories. In this example, the trainee has input barcode information for particular clothing items including shoes, a bag, and an accessory to complete the set of the clothing item selections.

Figure 10:

FIG. 10 depicts an example GUI 1000 in which the training and evaluation system presents a summary of the selected clothing items. In this example, the system may indicate that the trainee has successfully located and input clothing items for all the required categories. The system may then proceed to evaluate the trainee's selections. In some cases, if the trainee has not identified items for all required categories, the system may display a different GUI (not shown) indicating to the trainee that additional clothing item input is expected.

Figure 11:
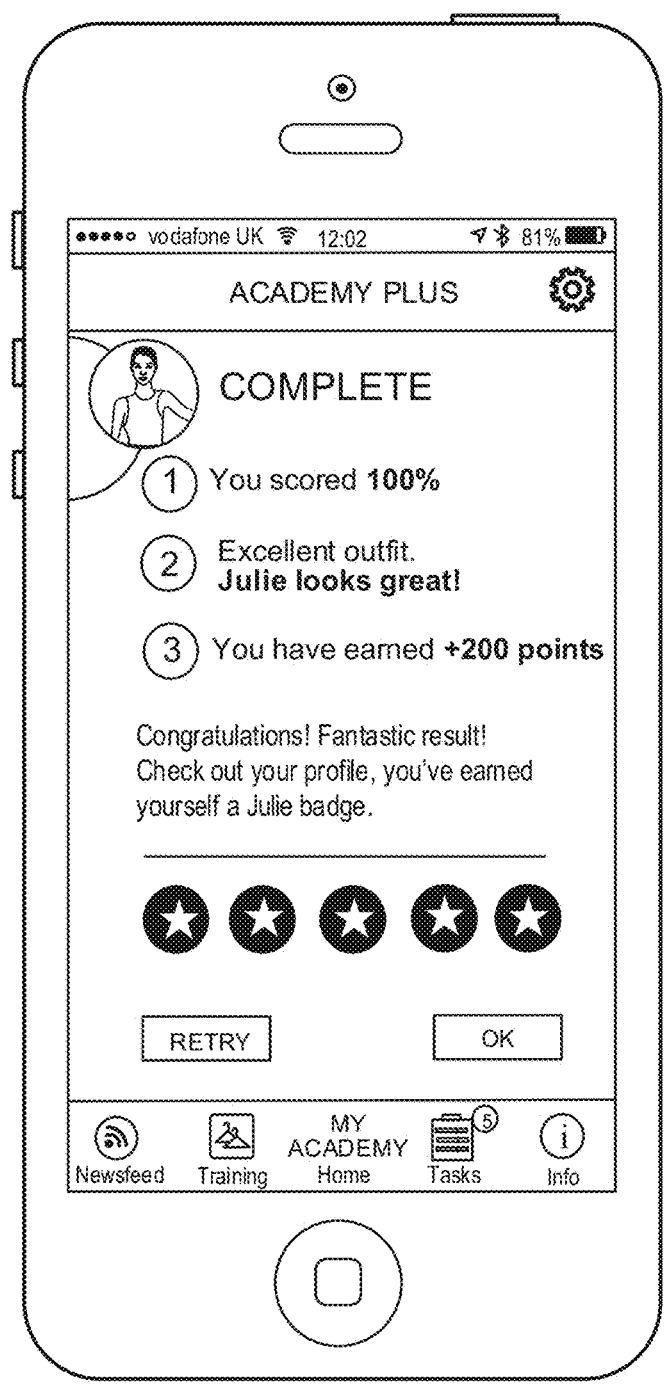

FIG. 11 depicts an example GUI 1100 in which the training and evaluation system presents results of the training session. The evaluation result may include any data from the evaluation of the evaluation criteria. For example, the result may include a rating of the employee's performance on the clothing selection task. The evaluation result may also include subjective comments, rewards that have been earned by the trainee, and/or other types of evaluation information.

Figure 12:
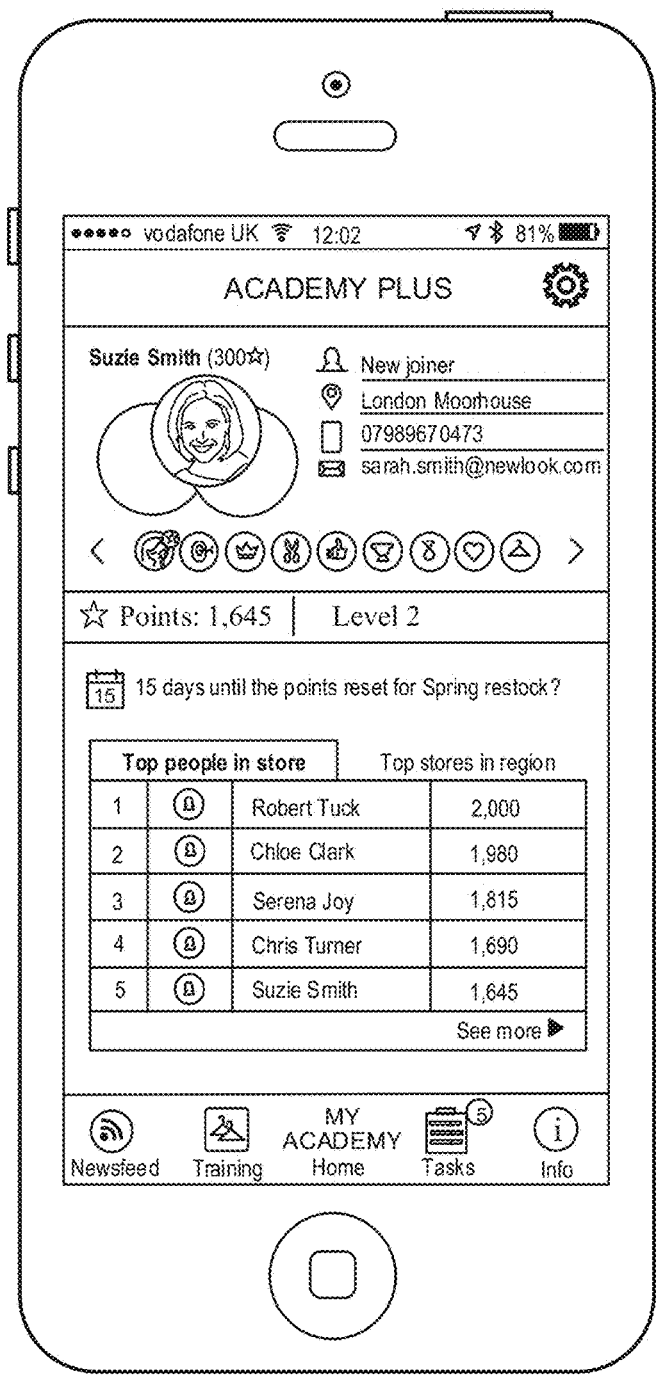

FIG. 12 depicts an example GUI 1200 in which the training and evaluation system presents a list of trainees and their respective scores and/or rewards earned. The system may store a cumulative number of rewards/points earned by different trainees, a training level earned by the trainees, or other data associated with trainees, and display the information.

The system may utilize one or more algorithms to evaluate a trainee's clothing item selection. For example, the system may determine evaluation results based on subjective criteria, such as attributes of individual clothing item selections, matching or mismatching combinations of clothing item selections, fashion trends. In some implementations, the system may also utilize objective criteria, such as a time that was required by the trainee to physically locate and scan different clothing items in the store.

In some implementations, the system may evaluate the trainee's clothing item selections by comparing the trainee's selections of clothing items with evaluation criteria that were specified by the business. In some implementations, the system may evaluate the trainee's selections by determining a degree to which the trainee's selections correspond to subjective fashion criteria that were specified by the business.

As an example, the system may automatically evaluate the trainee's set of clothing item selections by determining a degree to which the individual clothing items in the set of selected items are compatible with each other. In some implementations, the system may automatically determine a compatibility score for the trainee's set of clothing item selections. The system may determine the compatibility score based on at least one attribute of each clothing item selection. An attribute for a clothing item selection may be any attribute of clothing that is defined by the store's evaluation criteria. For example, an attribute of the clothing item selection may be a color, and determining the compatibility score may include comparing the colors of the clothing item selections to determine if the clothing item selections are compatible.

In some implementations, the evaluation criteria may involve trends related to the business. For example, in the context of a retail clothing store, the evaluation criteria may include identifying a fashion trend. Automatically evaluating the set of clothing item selections may include determining a degree to which each clothing item selection conforms to the clothing trend identified by the evaluation criteria. For example, the system may determine that a trainee's shirt selection conforms to a fashion trend, but that a skirt selection does not conform to the fashion trend. The system may determine an overall evaluation score based on both conforming and nonconforming items in the trainee's selections. As such, the system may enable a store to identify trends related to the business, and to train and evaluate its employees with respect to their knowledge of those trends.

In some implementations, the system may associate the clothing selection task with a particular training scenario. Examples of training scenarios may include a particular role of the trainee, a particular time frame in which the training takes place, and/or particular skills to be developed for the trainee, as illustrated by the training modules in FIG. 3. A particular training scenario may include one or more evaluation criteria for evaluating the clothing items selections of a trainee in the context of that particular training scenario. The evaluation criteria may include particular trends or attributes of clothing that are relevant to the particular training scenario. As an example, if the trainee selected a winter holiday clothing item in the context of a "Seasonal Christmas" training scenario, then the system may use the evaluation criteria to evaluate that the trainee's selection was appropriate. In some implementations, the system may automatically modify the training and/or evaluation program based on a particular time of year, based on results of a particular trainee's evaluation, or other factors.

As such, the system may enable a dynamic, adaptive, and engaging training and evaluation program in which employees may physically participate while on the job to become familiar with a store's business trends, customers, and locations of different clothing items throughout the store.

In addition to training modules, in some implementations, the system may also enable collaboration and communication between employees and other members of the business. For example, the system may provide newsfeeds, training updates and alerts, indications of when trainees complete training modules, recent news about the store or industry, current trends, announcements from store management or employees, and/or social interactions such as liking/sharing/commenting with other trainees or members of the business FIGS. 13-15 illustrate examples of collaboration and communication techniques that may be enabled in some implementations.

Figure 13:
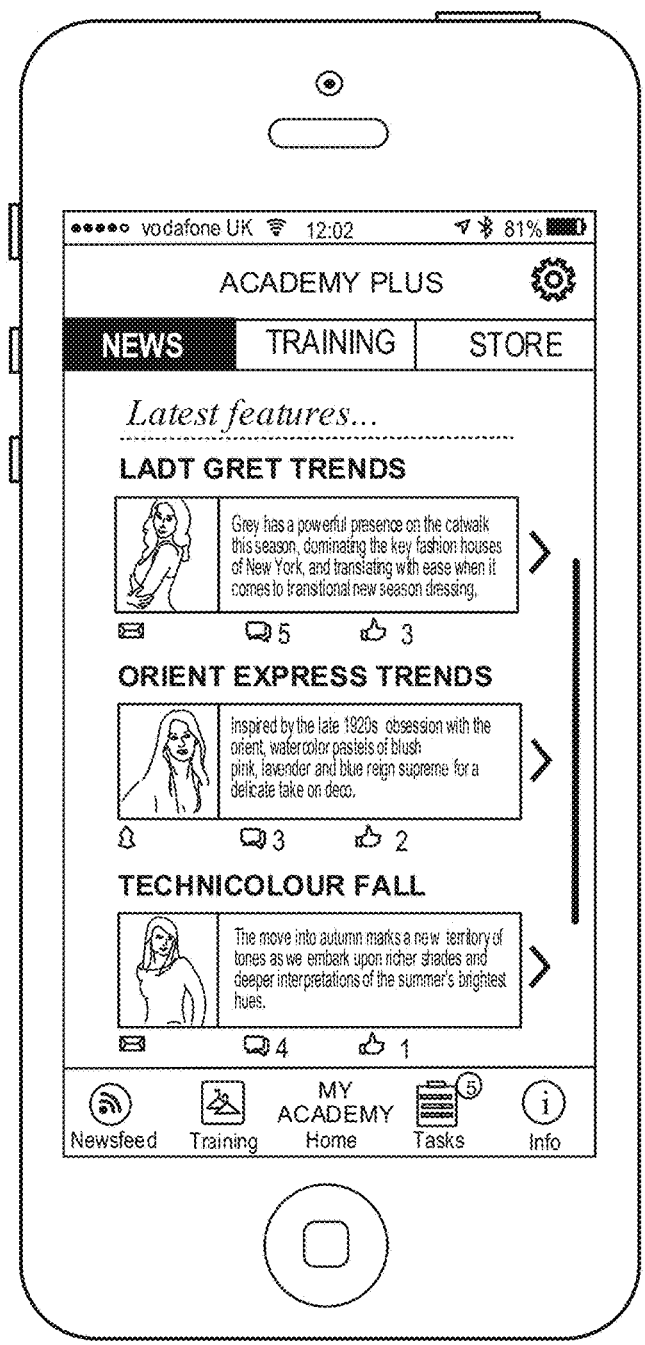

FIG. 13 depicts an example GUI 1300 in which the training and evaluation system presents a newsfeed. In this example, the newsfeed includes recent trends and seasonal news items related to the store's business. The GUI 1300 may enable users to indicate "likes" or include comments for different news items in the news feed, which may appear on newsfeeds of other users. Selecting on a particular item in the news feed may display further details of that the item, including "tips and tricks" or other advice for employees on how to implement the trend described in the news item.

Figure 14:
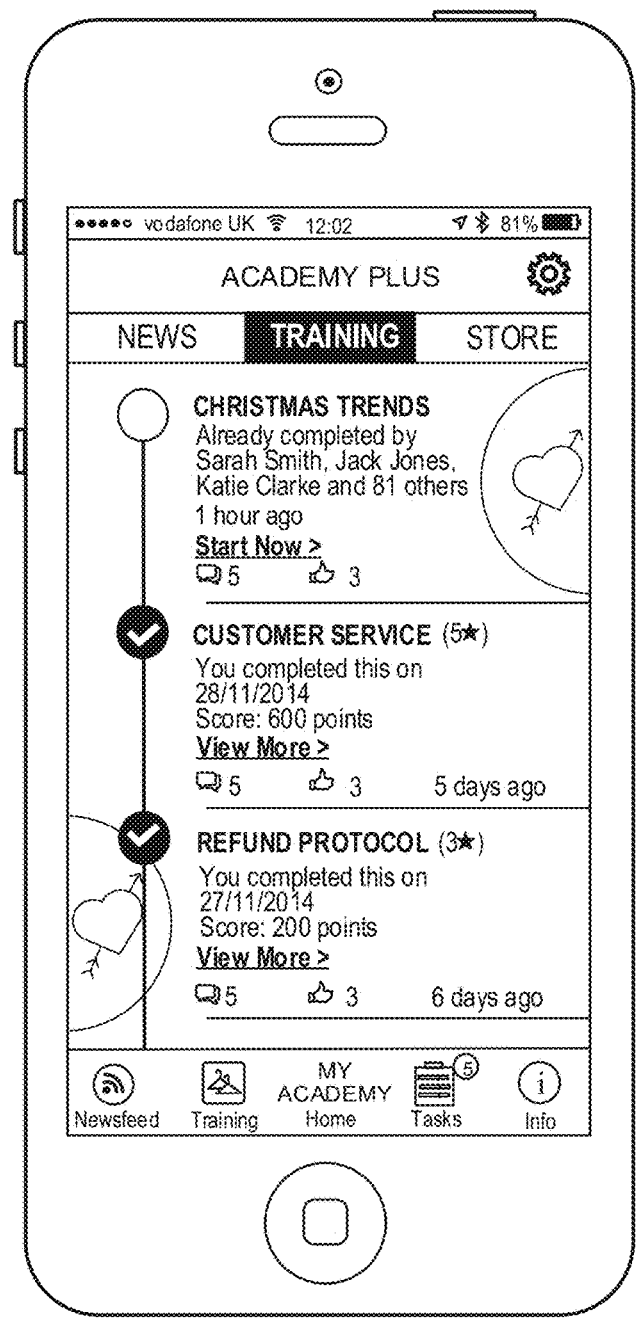

FIG. 14 depicts an example GUI 1400 in which the training and evaluation system presents a training summary. The training summary indicates training modules that the trainee has completed and those that have yet to be completed. In some implementations, the system may also indicate the progress of other trainees and highlight other trainees who have completed training, for example, to incentivize the particular trainee to progress further in the training. The GUI 1400 may also enable users to indicate "likes" or include comments for different training scenarios, which may appear on training summaries of other users.

Figure 15:
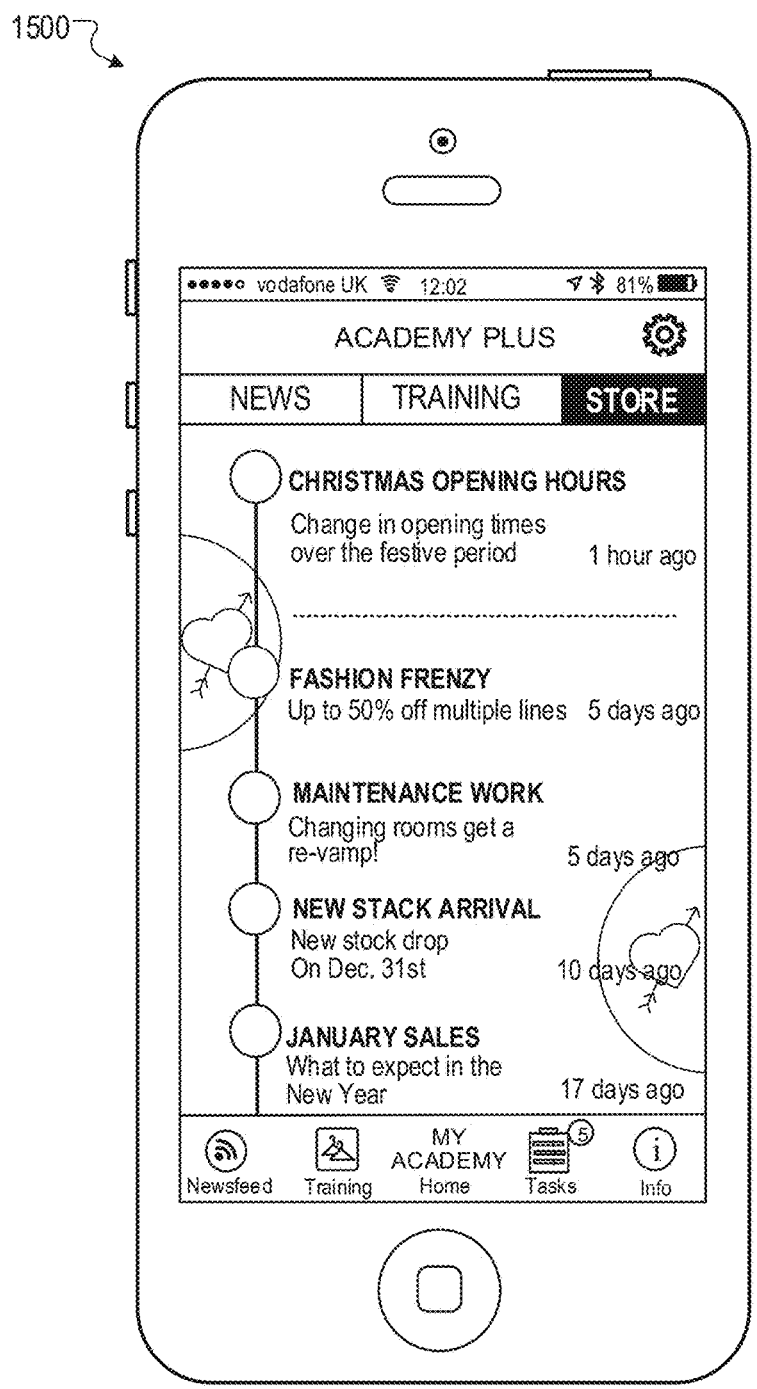

FIG. 15 depicts an example GUI 1500 in which the training and evaluation system presents information related to the store. Such information may include, for example, updates and announcements related to operations of the store, such as change in business hours during holidays, promotions and sales, new stock arrivals, etc.

In some implementations, the system may enable a store to specify a particular list of tasks to be completed by employees. The list of tasks may be viewed by one or more employees responsible for completing those tasks. As such, the system may enable a store manager or a central business center for a retail branch to specify various tasks related to store, such as unpacking items, cleaning parts of the store, etc. The system may enable employees to edit the list of tasks to mark tasks that have been completed. In some implementations, the system may also indicate a deadline for completing the tasks, and a time remaining until the deadline.

Figure 16:
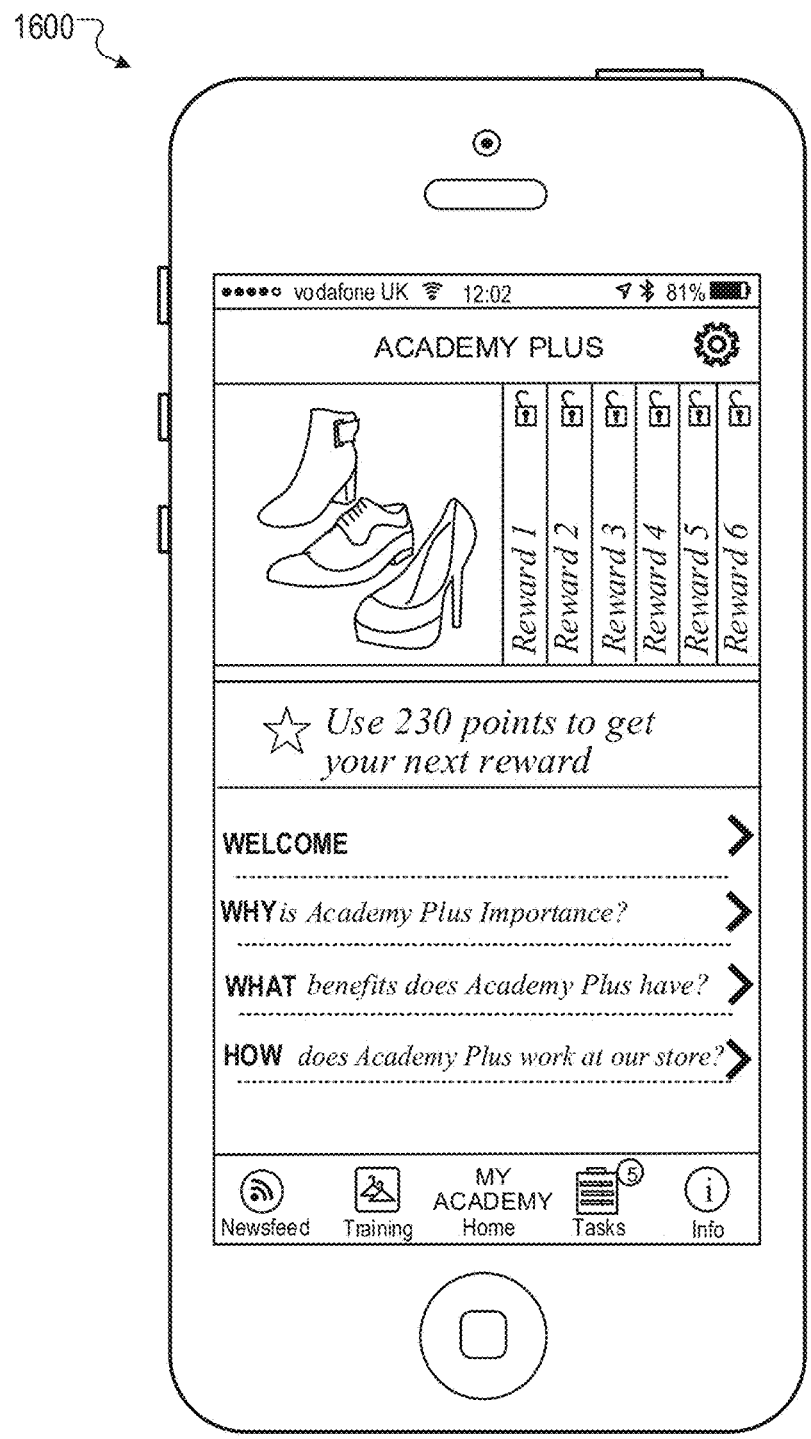

FIG. 16 depicts an example GUI 1600 in which the training and evaluation system presents information regarding rewards collected by a trainee and enables the trainee to redeem the rewards. The system may enable a trainee to collect rewards based on successfully completed training scenarios, completed tasks, or other criteria specified by the store. The system may enable a trainee to redeem rewards for a real-world benefit, such as monetary bonuses, free items from the store, recognition and awards, etc.

FIGS. 17 to 20 depict example GUIs that display a visual merchandising implementation of the system. In these examples, the system facilitates compliance with visual merchandising guidelines that have been provided to employees of a store. For example, the visual merchandising guidelines may specify particular clothing items or types of clothing items to be placed in particular locations in the store, such as on mannequins and/or store display windows. The system may provide GUIs, such as those shown in FIGS. 17 to 20, that may enable an employee to view the visual merchandising guidelines, to locate and scan particular clothing items specified by the visual merchandising guidelines into the employee's mobile device, and to send a confirmation of the fully assembled visual merchandising display using the employee's mobile device.

In some implementations, the system may present guidelines on one or more different visual merchandising displays that have been specified by a business. These guidelines may be arranged by "priority" and may specify, for example, that particular clothing items, particular combinations of clothing items, particular trends, particular seasonal concepts, etc., be displayed in the store.

Figure 17:
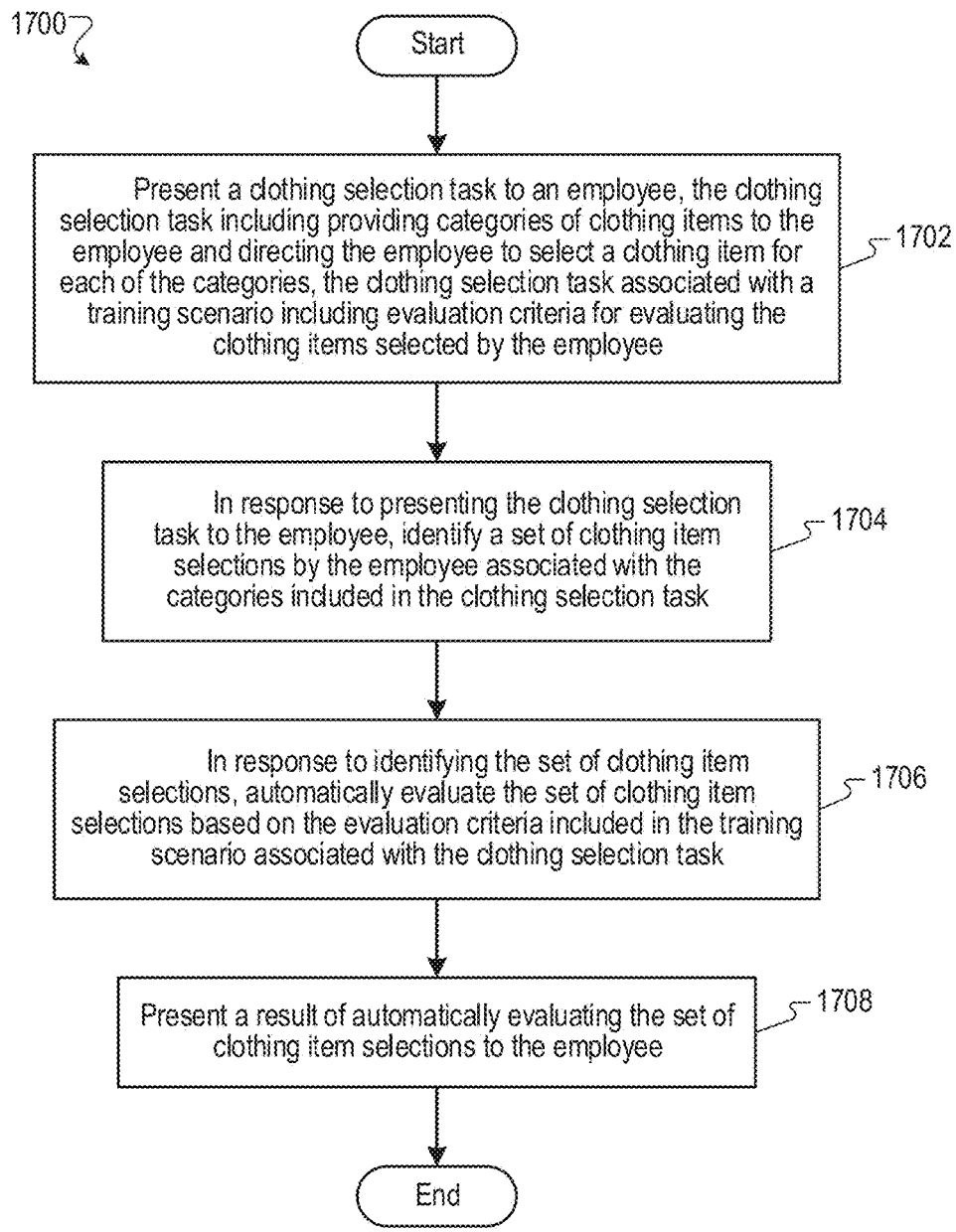

FIG. 17 depicts an example GUI 1700 in which the training and evaluation system presents information regarding one or more clothing items that have been specified by visual merchandising guidelines to be displayed in "Ladies Window 1" in the store. The information may include, for example, the particular clothing items, or types of clothing items, to be displayed, the stock levels of the clothing items in the store, or other information. The system may enable the employee to press a "locate" button in GUI 1700 to enter identifying information for each physical clothing item that the employee locates throughout the store for the window display "Ladies Window 1."

Figure 18:
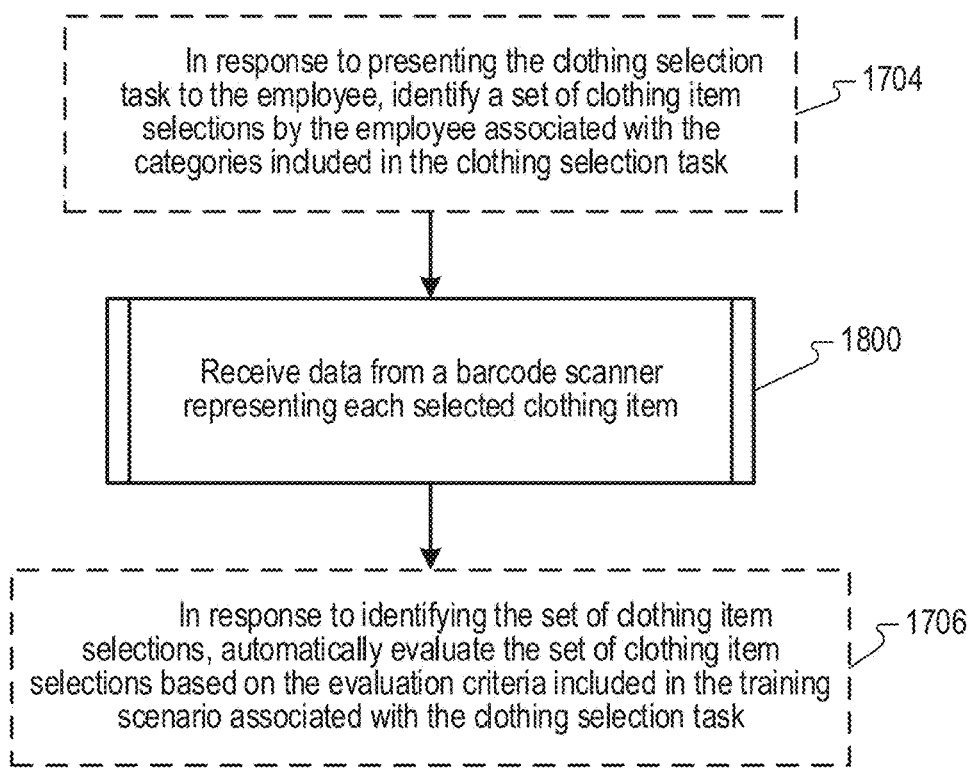

FIG. 18 depicts an example GUI 1800 instructing the employee to find and locate each physical clothing item that was specified in the visual merchandising guideline in FIG. 17. In the example of FIG. 18, the system may enable the employee to scan and input a barcode for a physical clothing item. In some implementations, other types of identifying information for the physical clothing items may be input by the employee, such as, for example, a photograph of the clothing item, or other identifiying information.

Figure 19:
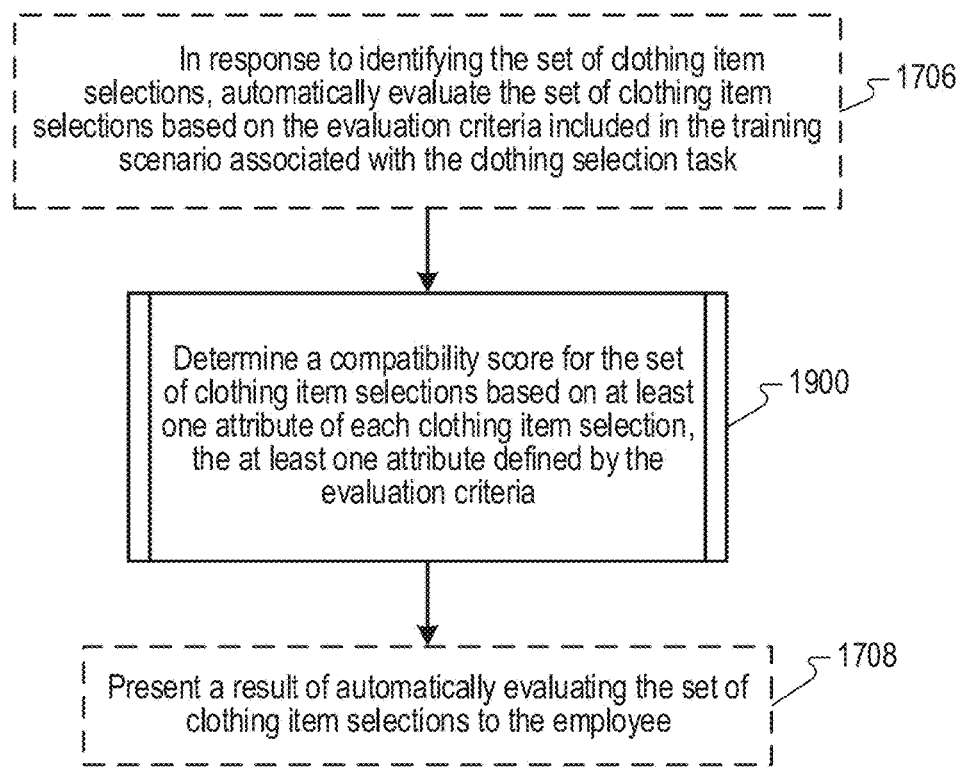

The system may then enable the employee to use the scanned clothing items to assemble a virtual display, as depicted in FIG. 19. In this example, GUI 1900 enables an employee to use the physically-located clothing items to assemble a virtual visual merchandising display, by automatically placing the clothing items on a virtual mannequin. As such, the system may provide easy-to-follow guidelines and confirmations for the employee to assemble a physical mannequin or other physical display in the store using the physical clothing items that the employee has located.

In some cases, once the system has confirmed that the user has selected the appropriate clothing items for the display according to the visual merchandising guidelines, the system may enable the employee to send confirmation information of the physical display that has been assembled.

Figure 20:
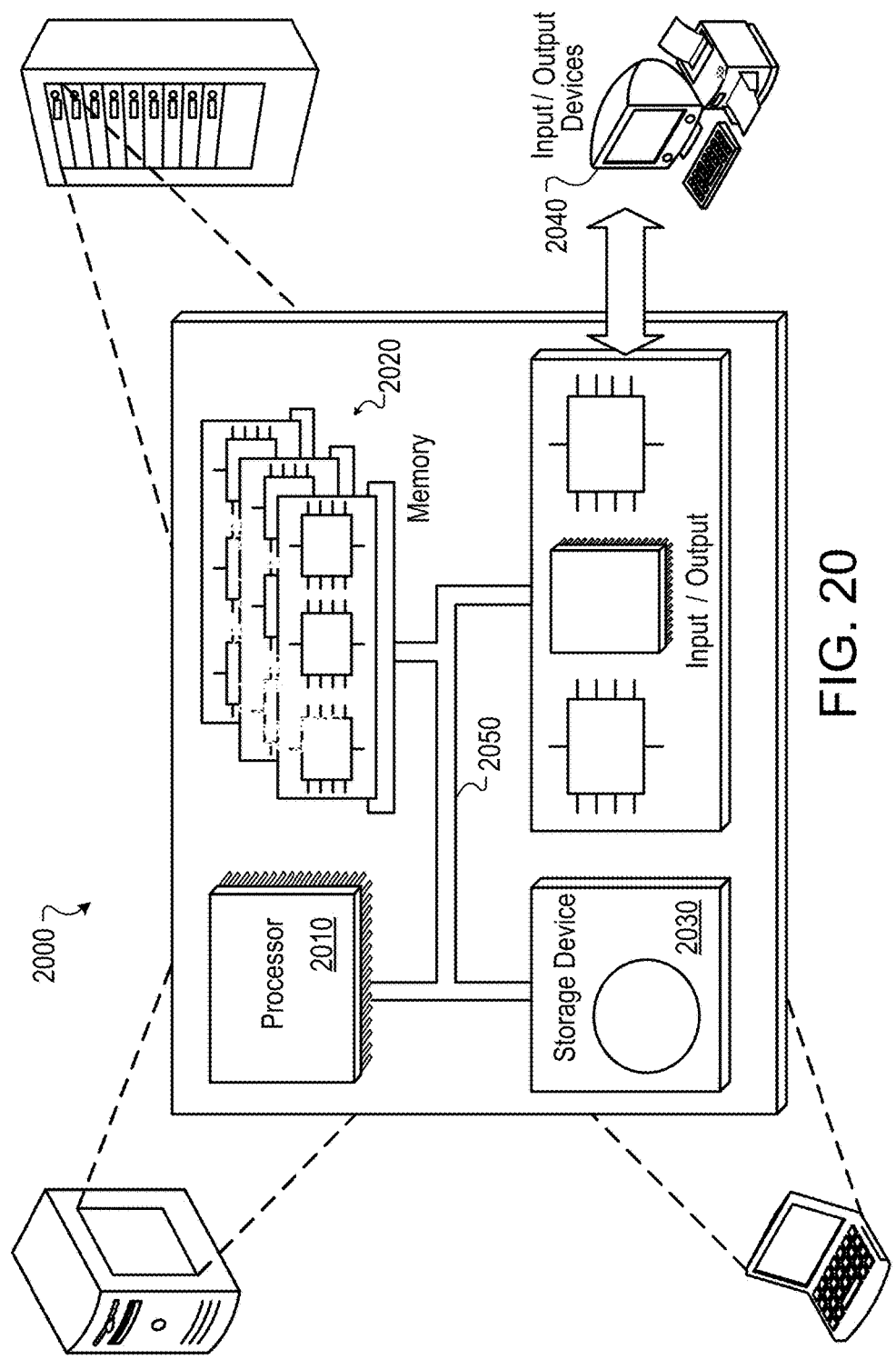

For example, FIG. 20 depicts a GUI 2000 that confirms that the employee has selected the appropriate clothing items for the visual merchandising display, and instructs the employee to take a picture of the completed physical display. In the example of FIG. 20, the employee is instructed to take a photograph of the completed physical display and press a "send" button, which submits the photograph to an entity, such as a central database associated with the store, a manager, other employees, etc. As an example, the system may transmit and store the photographed display in a central database and may also display the photographed display in mobile devices of other employees, for example, in a "social feed" of a GUI display.

As such, the training and evaluation system may enable a business to facilitate compliance by its employees in assembling visual merchandising displays according to guidelines that have been specified by the business.

FIGS. 21 to 23 are flow charts depicting examples of performing automated training and evaluation of employees.

FIG. 21 depicts an example process 2100 of performing automated training and evaluation of an employee. In this example, the system presents a clothing selection task to an employee (2102). The clothing selection task includes providing categories of clothing items to the employee and directing the employee to select a clothing item for each of the categories. The clothing selection task may be associated with a training scenario that includes evaluation criteria for evaluating the clothing items selected by the employee.

In response to presenting the clothing selection task to the employee, the system identifies a set of clothing item selections by the employee (2104). The clothing items selections may be associated with the categories included in the clothing selection task criteria for evaluating the clothing items selected by the employee.

In response to identifying the set of clothing item selections, the system automatically evaluates the set of clothing item selections (2106). The evaluation is performed based on the evaluation criteria included in the training scenario associated with the clothing selection task.

The system then presents results of automatically evaluating the set of clothing item selections to the employee (2108).

FIG. 22 depicts further details of the operation of identifying a set of clothing item selections by the employee (e.g., operation 2104 in FIG. 21). In this example, the system identifies a clothing item selection by receiving data from a barcode scanner representing each selected clothing item (2200). The barcode scanner may be implemented on a mobile device carried by the trainee, for example. Additionally or alternatively, in some implementations, the system may identify a clothing item selection by receiving an image or other identification information for the selected clothing item from the trainee's mobile device.

FIG. 23 depicts further details of automatically evaluating a trainee's set of clothing item selections (e.g., operation 2106 in FIG. 21). In this example, the system evaluates the trainee's selections by determining a compatibility score for the set of clothing items selections based on at least one attribute of each clothing item selection (2300). The attributes may be defined by the evaluation criteria included in the training scenario.

FIG. 24 is a schematic diagram of an example of a computer system that can be used for the operations described in association with the techniques described herein.

The system 2400 includes a processor 2410, a memory 2420, a storage device 2430, and an input/output device 2440. Each of the components 2410, 2420, 2430, and 2440 are interconnected using a system bus 2450. The processor 2410 is capable of processing instructions for execution within the system 2400. In one implementation, the processor 2410 is a single-threaded processor. In another implementation, the processor 2410 is a multi-threaded processor. The processor 2410 is capable of processing instructions stored in the memory 2420 or on the storage device 2430 to display graphical information for a user interface on the input/output device 2440.

The memory 2420 stores information within the system 2400. In one implementation, the memory 2420 is a computer-readable medium. In one implementation, the memory 2420 is a volatile memory unit. In another implementation, the memory 2420 is a non-volatile memory unit. The processor 2410 and the memory 2420 may perform various types of data manipulation.

The storage device 2430 is capable of providing mass storage for the system 2400. In one implementation, the storage device 2430 is a computer-readable medium. In various different implementations, the storage device 2430 may be a floppy disk device, a hard disk device, an optical disk device, or a tape device. The storage device 2430 may store various types of data associated with the techniques described herein.

The input/output device 2440 provides input/output operations for the system 2400. In one implementation, the input/output device 2440 includes a keyboard and/or pointing device. In another implementation, the input/output device 2440 includes a display unit for displaying graphical user interfaces. The input/output device 2440 may be used to perform data exchange with other devices.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit for use in a computing environment.

Processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

While this specification contains many specifics, these should not be construed as limitations on the scope of the disclosure or of what may be claimed, but rather as descriptions of features specific to particular implementations. Certain features that are described in this specification in the context of separate implementations may also be provided in combination in a single implementation. Conversely, various features that are described in the context of a single implementation may also be provided in multiple implementations separately or in any sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A computer-implemented method executed by one or more processors, the method comprising:

receiving, by a mobile device of an automated training and evaluation system that includes (i) the mobile device that comprises a display and an RFID reader, a bar code scanner, or an image capture device, (ii) an administrative server that stores data that reflects one or more fashion trends or trends related to a business associated with the administrative server, and (iii) one or more geo-location devices that are each associated with a different clothing item, the data from the administrative server that reflects the one or more fashion trends or trends related to the business associated with the administrative server;

presenting, by the mobile device of the automated training and evaluation system, a clothing item selection and location task to an employee of a store, comprising providing, on the display and for completion during a training scenario, categories of clothing items to the employee and directing the employee to (i) select clothing items that each match the categories in accordance with the one or more fashion trends or trends related to the business, and (ii) physically locate, and read, scan, or capture a geo-location device associated with, each of the selected clothing items that match the categories in accordance with the one or more fashion trends or trends related to the business;

after clothing items that match a proper subset of the categories have been selected and before clothing items that match all of the categories have been selected, and in response to presenting the clothing item selection and location task to the employee, identifying, by the mobile device of the automated training and evaluation system, a set of clothing item selections that (i) the employee selected as matching the proper subset of the categories in accordance with the one or more fashion trends or trends related to the business, and (ii) the employee physically located and whose associated geo-location device was read, scanned, or captured using the mobile device by the employee, the set of clothing item selections being identified, in part, from data received by way of one or more physical read, scan, or capturing interactions between the RFID reader, the bar code scanner, or the image capture device of the mobile device and the one or more respective geo-location devices associated with the set of clothing item selections;

after the clothing items that match a proper subset of the categories have been selected and before clothing items that match all of the categories have been selected, determining, by the mobile device of the automated training and evaluation system and based at least in part from the data received by way of one or more physical read, scan, or capture interactions between the RFID reader, the bar code scanner, or the image capture device of the mobile device and the one or more respective geo-location devices associated with the set of clothing items selections, an amount of time the employee used to physically locate, and read, scan, or capture the geo-location device associated with each of the selected clothing items that match the proper subset of the categories in accordance with the one or more fashion trends or trends related to the business;

after the clothing items that match a proper subset of the categories have been selected and before clothing items that match all of the categories have been selected, and in response to identifying the set of clothing item selections, automatically generating, by the mobile device of the automated training and evaluation system, a combined result of evaluating the selecting and physical locating of the set of clothing item selections in accordance with both (a) subjective evaluation criteria including at least criteria that measures the extent to which clothing items selected by the employee indicate a matching combination in accordance with the one or more fashion trends or trends related to the business, and (b) objective evaluation criteria including at least criteria that measures the amount of time the employee used to physically locate, and read, scan, or capture the geo-location device associated with the set of clothing item selections that match the one or more categories in accordance with the one or more fashion trends or trends related to the business; and after the clothing items that match a proper subset of the categories have been selected and before clothing items that match all of the categories have been selected, presenting, by the display of the mobile device of the automated training and evaluation system, (i) a representation of the combined result of evaluating the selecting and physical locating of the set of clothing item selections in accordance with both (a) the subjective evaluation criteria and (b) the objective evaluation criteria, the combined result being used, in part, to determine, by the administrative server of the automated training and evaluation system, one or more incentives for the employee when the employee completes the training scenario, (ii) textual evaluation results associated with the set of clothing item selections, (iii) earned incentives associated with the set of clothing item selections, and (iv) a control for enabling the employee to resume selecting clothing items for one or more remaining categories.

2. The method of claim 1, wherein identifying the set of clothing item selections further includes receiving an image of each selected clothing item.

3. The method of claim 1, wherein identifying the set of clothing item selections includes receiving data from the barcode scanner representing each selected clothing item.

4. The method of claim 1, comprising determining a compatibility score for the set of clothing item selections based on at least one attribute of each clothing item selection, the at least one attribute defined by the evaluation criteria.

5. The method of claim 4, wherein the at least one attribute is color, and determining the compatibility score includes comparing the colors of the clothing item selections to determine if the clothing item selections are compatible.

6. The method of claim 1, wherein the subjective evaluation criteria identifies a clothing trend and includes attributes of clothing items conforming to the clothing trend.

7. The method of claim 6, comprising determining a degree to which each clothing item selection conforms to the clothing trend identified by the subjective evaluation criteria.

8. The method of claim 1, wherein the categories of clothing items include at least one of shoes, shirts, skirts, or accessories.

\* \* \* \* \*